US011988807B2

(12) United States Patent
Ahiko et al.

(10) Patent No.: US 11,988,807 B2
(45) Date of Patent: May 21, 2024

(54) OPTICAL MEMBER, METHOD OF PRODUCING OPTICAL MEMBER, AND APPARATUS FOR TRANSMITTING OPTICAL INFORMATION

(71) Applicants: MITSUI CHEMICALS, INC., Tokyo (JP); AHIKO FINETEC, LTD., Shinjo (JP)

(72) Inventors: Soichiro Ahiko, Shinjo (JP); Daisuke Tanaka, Shinjo (JP); Shinichi Umeda, Yokohama (JP)

(73) Assignees: MITSUI CHEMICALS, INC., Minato-ku (JP); AHIKO FINETEC, LTD., Shinjo (JP)

( * ) Notice: Subject to any disclaimer, the term of this patent is extended or adjusted under 35 U.S.C. 154(b) by 327 days.

(21) Appl. No.: 17/425,761

(22) PCT Filed: Feb. 4, 2020

(86) PCT No.: PCT/JP2020/004094
§ 371 (c)(1),
(2) Date: Jul. 26, 2021

(87) PCT Pub. No.: WO2020/170801
PCT Pub. Date: Aug. 27, 2020

(65) Prior Publication Data
US 2022/0120935 A1    Apr. 21, 2022

(30) Foreign Application Priority Data
Feb. 18, 2019 (JP) .................................. 2019-026906

(51) Int. Cl.
*G02B 1/04* (2006.01)
*B24B 37/08* (2012.01)
(Continued)

(52) U.S. Cl.
CPC ................ *G02B 1/04* (2013.01); *B24B 37/08* (2013.01); *G02B 6/262* (2013.01); *G02B 2027/0125* (2013.01); *G02B 27/0172* (2013.01)

(58) Field of Classification Search
CPC ...... G02B 1/04; G02B 6/262; G02B 27/0172; G02B 2027/0125; B24B 37/08
See application file for complete search history.

(56) References Cited

U.S. PATENT DOCUMENTS 5,382,463 A * 1/1995 Adkins .................. G11B 5/735
428/689
2018/0088271 A1    3/2018 Yokoyama

FOREIGN PATENT DOCUMENTS

CN    103611586 A  *  3/2014    ................ B01L 3/00
JP    H11316302 A     11/1999
(Continued)

OTHER PUBLICATIONS

Anonymous: "The Amazing Anatomy of James Webb Space Telescope Mirrors, NASA", Apr. 20, 2014, pp. 1-5, XP055975235. (Cited in Extended European Search Report dated Nov. 25, 2022, for EP Application No. 20758557.1).
(Continued)

*Primary Examiner* — Daniel Petkovsek
(74) *Attorney, Agent, or Firm* — BUCHANAN, INGERSOLL & ROONEY PC

(57) ABSTRACT

The present invention provides an optical member including an organic polymer. This optical member includes a surface A which has an area of 1 mm² or more, and in which the flatness of a region having an area of 1 mm², as measured by a non-contact type optical flatness meter, is 80 μm or less.

14 Claims, 4 Drawing Sheets

(51) Int. Cl.
    *G02B 6/26*     (2006.01)
    *G02B 27/01*    (2006.01)

(56)         References Cited

FOREIGN PATENT DOCUMENTS

| JP | 2006343548 A    | 12/2006 |
| JP | 6002528 B2      | 10/2016 |
| JP | 2018060155 A    | 4/2018  |
| WO | 2014/208270 A1  | 12/2014 |
| WO | 2017/141242 A2  | 8/2017  |

OTHER PUBLICATIONS

Yoshida, T, et al., "A plastic holographic waveguide combiner for light-weight and highly-transparent augmented reality glasses", Journal of the Society for Information Display—SID, vol. 26, No. 5, Apr. 30, 2018, pp. 280-286, XP055893992. (Cited in Extended European Search Report dated Nov. 25, 2022, for EP Application No. 20758557.1).

* cited by examiner

OPTICAL MEMBER, METHOD OF PRODUCING OPTICAL MEMBER, AND APPARATUS FOR TRANSMITTING OPTICAL INFORMATION

TECHNICAL FIELD

The present disclosure relates to an optical member, a method of producing the optical member, and an apparatus for transmitting optical information.

BACKGROUND ART

In recent years, requirements on flatness, surface defects and the like of glass substrates for electronic devices are getting stricter. For example, glass substrates for electronic devices, such as glass substrates for mask blanks, which have a high flatness and less microdefects (such as recess defects and protrusion defects) are demanded. As a method for producing such glass substrates for mask blanks which have a high flatness and less microdefects (such as recess defects and protrusion defects), a method has been investigated in which: a plurality of glass substrates are sandwiched between an upper lapping plate and a lower lapping plate that are disposed so as to face each other in the vertical direction and each provided with a polishing pad; and both main surfaces of the glass substrates are polished, while supplying a polishing liquid to the glass substrates from the side of the upper lapping plate (see Patent Document 1, for example).

Patent Document 1: Japanese Patent Publication (JP-B) No. 6002528

SUMMARY OF INVENTION

Technical Problem

Optical members are desired to be capable of transmitting light with a high accuracy, and inorganic materials such as glass have been used, because of ease of production by polishing and the like. In recent years, however, reduction in weight is required for optical members for use in wearable devices, for example, and attempts have been made to achieve a reduction in weight by reducing the thickness of optical members made of inorganic materials.

It is common technical knowledge that, although a further reduction in weight can be expected by using organic materials instead, as materials for optical members, it causes problems, for example, that optical members become more susceptible to deformation and damage when processing organic materials into optical members. Accordingly, optical members produced using organic materials are difficult to achieve a highly accurate transmission of optical information, and attempts to use organic materials for optical members are extremely rare.

The present disclosure has been made in view of the problems described above, and an object of the present disclosure is to provide an optical member which is lightweight and is capable of transmitting optical information with a high accuracy, a method of producing the same, and an apparatus for transmitting optical information including the optical member.

Solution to Problem

The present disclosure relates to the following embodiments.

<1> An optical member comprising an organic polymer, wherein the optical member comprises a surface A which has an area of 1 $mm^2$ or more, and in which a flatness of a region having an area of 1 $mm^2$, as measured by a non-contact type optical flatness meter, is 80 µm or less.

<2> The optical member according to <1>, wherein the flatness of the surface A is 50 µm or less.

<3> The optical member according to <1> or <2> comprising a surface B located on an opposite side of the surface A, and having an area of 1 $mm^2$ or more, wherein, when a flatness of a region having an area of 1 $mm^2$ is measured for each of the surface A and the surface B by the non-contact type optical flatness meter, an absolute value of a difference between the flatness of the surface A and the flatness of the surface B is 5 µm or less.

<4> An optical member comprising an organic polymer, wherein the optical member comprises:
a surface A having an area of 1 $mm^2$ or more; and
a surface B located on an opposite side of the surface A, and having an area of 1 $mm^2$ or more; and
wherein, when a flatness of a region having an area of 1 $mm^2$ is measured for each of the surface A and the surface B by a non-contact type optical flatness meter, an absolute value of a difference between the flatness of the surface A and the flatness of the surface B is 5 µm or less.

<5> The optical member according to <3> or <4>, wherein an average distance between the surface A and the surface B is 10 mm or less.

<6> The optical member according to any one of <1> to <5>, wherein an arithmetic average roughness Ra of a region having an area of 4,200 $µm^2$ in the surface A, as measured by a non-contact type optical surface roughness tester, is 10 nm or less.

<7> The optical member according to any one of <1> to <6>, wherein the optical member has a refractive index of 1.58 or more.

<8> The optical member according to any one of <1> to <7>, wherein, a plurality of linear marks having a height of 50 nm or less are observed, in an image of a region having an area of 4,200 $µm^2$ in the surface A, when the region is imaged by a non-contact type optical surface roughness tester.

<9> The optical member according to any one of <1> to <8>, wherein the optical member has a Vickers hardness at 23° C. of 1 GPa or less.

<10> The optical member according to any one of <1> to <9>, wherein the optical member has a tensile elastic modulus at 23° C. of from $1.0 \times 10^3$ MPa to $5.0 \times 10^3$ MPa.

<11> The optical member according to any one of <1> to <10>, wherein the organic polymer comprises at least one selected from the group consisting of a poly(thio)urethane resin, an episulfide resin, a polycarbonate resin, a polyester resin, a polyamide resin, a polyimide resin, a poly(meth)acrylate resin, a polyolefin resin, a polyurea-urethane resin, a polysulfide resin, a poly(meth)(thio)acrylate resin and an allyl diglycidyl carbonate resin.

<12> The optical member according to any one of <1> to <11>, wherein the optical member is for use in a wearable device.

<13> A method of producing the optical member according to any one of <1> to <12>, the method comprising:

a step of preparing a molded member including an organic polymer; and a first polishing step of polishing the molded member with a polishing pad, after arranging the molded member in a movement restriction member which restricts the movement of the molded member during the polishing of the molded member, wherein, in the first polishing step, the molded member is polished using an abrasive material having a grain size of 3 μm or more.

<14> The method of producing the optical member according to <13>, wherein the molded member is movable relative to the movement restriction member, during the polishing of the molded member with the polishing pad.

<15> The method of producing the optical member according to <13> or <14>, wherein, in the first polishing step, the molded member is arranged in the movement restriction member such that a clearance between the molded member and the movement restriction member is 1 mm or more.

<16> The method of producing the optical member according to any one of <13> to <15>, further comprising a second polishing step of polishing the molded member after being subjected to the first polishing step, with a polishing pad and an abrasive material.

<17> An apparatus for transmitting optical information, the apparatus comprising:

a light irradiation section; and a light guide comprising a plurality of the optical members according to any one of claims 1 to 12, wherein the plurality of the optical members are arranged such that principal surfaces of the optical members are substantially parallel to one another.

Advantageous Effects of Invention

The present disclosure enables to provide an optical member which is lightweight and is capable of transmitting optical information with a high accuracy, a method of producing the same, and an apparatus for transmitting optical information including the optical member.

DESCRIPTION OF EMBODIMENTS

Figure 1:
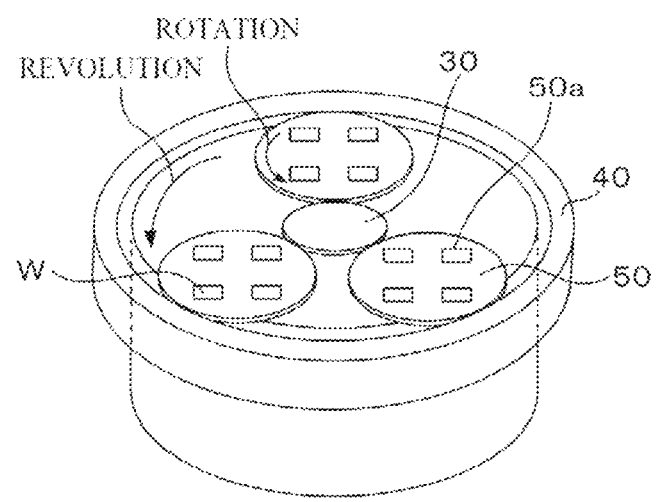
FIG. 1 is a perspective view showing a meshing relationship between a sun gear, an internal gear and movement restriction members, in a planetary gear system.

Examples of preferred embodiments of the present disclosure will now be described in detail. The following descriptions and Examples are for illustrating the embodiments, and are not intended to limit the scope of the embodiments.

In the present disclosure, any numerical range described using the expression "from * to" represents a range in which numerical values described before and after the "to" are included in the range as a lower limit value and an upper limit value, respectively.

In the present disclosure, the definition of the term "step" includes not only an independent step, but also a step which is not clearly distinguishable from another step, as long as the purpose of the step is achieved.

In the present disclosure, the term "optical member" refers to a member composed of at least one layer including an organic polymer. An optical member according to the present disclosure may be in the form of a laminated body in which a plurality of members including an organic polymer are disposed one on another in layers, or may be in the form of a laminated body in which a member(s) including an organic polymer is/are layered with another member(s).

<Optical Member>

An optical member according to the present disclosure includes an organic polymer, and includes a surface A which has an area of 1 mm$^2$ or more, and in which the flatness of a region having an area of 1 mm$^2$, as measured by a non-contact type optical flatness meter, is 80 μm or less. The optical member according to the present disclosure is lightweight due to including an organic polymer, and is capable of transmitting optical information with a high accuracy due to including the surface A in which the flatness is 80 μm or less.

The position of the surface A in the optical member according to the present disclosure is not particularly limited. However, a configuration is preferred, in which the surface A is located on at least a part of the exposed surfaces (including a principal surface) of the optical member, because a high flatness of the surface A facilitates the transmission of optical information. In a case in which the surface A is located on a part of the exposed surfaces of the optical member according to the present disclosure, it is preferred that the surface A is located at a position at which the optical information to be transmitted by the surface A can be easily received. Specifically, the surface A is preferably located on the principal surface of the optical member, and further, in a region including the center of gravity of the principal surface is preferred.

The region to be measured by the non-contact type optical flatness meter is not particularly limited, as long as the region is a region in the surface A which has an area of 1 mm$^2$. Accordingly, the surface A in the optical member according to the present disclosure is required to include a region having an area of 1 mm$^2$ in which the flatness is 80 μm or less, and the flatness of the region other than that region in the surface A may be 80 μm or less, or more than 80 μm. The entire surface A may have a flatness of 80 μm or less, or alternatively, 10% or more of the total area of the surface A, preferably 50% or more of the total area of the surface A may have a flatness of 80 μm or less.

The region to be measured by the non-contact type optical flatness meter may be a region having an area of 1 mm$^2$ whose center is the center of gravity of the surface A.

The surface A is required to have a flatness of 80 μm or less, and is preferably 50 μm or less, more preferably 30 μm or less, still more preferably 20 μm or less, and particularly preferably 15 μm or less, from the viewpoint of improving the transmission of optical information.

The lower limit of the flatness of the surface A is not particularly limited as long as the flatness is 0 μm or more, and may be 1 μm or more, or 5 μm or more.

The area of the surface A is required to be 1 mm$^2$ or more, and can be selected as appropriate, depending on the application of the optical member. For example, the area of the surface A may be within the range of from 10 mm$^2$ to 20,000 mm$^2$, or from 100 mm$^2$ to 1,000 mm$^2$.

The optical member according to the present disclosure may include a surface B located on the opposite side of the surface A, and having an area of 1 mm² or more.

The preferred range of the area of the surface B is the same as the preferred range of the area of the surface A described above. Further, the areas of the surface A and the surface B area may be the same as, or different from, each other.

In the surface B, the flatness of a region having an area of 1 mm², as measured by the non-contact type optical flatness meter, may be 80 μm or less. The preferred range of the flatness of the surface B is the same as the preferred range of the flatness of the surface A described above.

In the optical member according to the present disclosure, when the flatness of a region having an area of 1 mm² is measured for each of the surface A and the surface B by the non-contact type optical flatness meter, the absolute value (hereinafter, also referred to as "parallelism") of the difference between the flatness of the surface A and the flatness of the surface B is preferably 5 μm or less. This configuration allows the optical member according to the present disclosure to transmit optical information with a high accuracy. For example, in a case in which a plurality of the optical members according to the present disclosure are layered such that the regions between which the parallelism is 5 μm or less are in contact with each other, to be formed into a laminated structure, the laminated structure enables to achieve the transmission of optical information with a high accuracy.

The parallelism as described above is more preferably 4 μm or less, and still more preferably 3 μm or less. The lower limit of the parallelism is not particularly limited as long as the parallelism is 0 μm or more, and may be 0.5 μm or more, or 1.0 μm or more.

The average distance between the surface A and the surface B may be 10 mm or less, 8 mm or less, or 6 mm or less. Further, the average distance between the surface A and the surface B may be 2 mm or more, or 4 mm or more.

In the present disclosure, the expression "average distance between the surface A and the surface B" refers to a value obtained by dividing the sum of the maximum value of the distance between the surface A and the surface B, and the minimum value of the distance between the surface A and the surface B, by 2.

In the optical member according to the present disclosure, the arithmetic average roughness Ra of a region having an area of 4,200 μm² in the surface A, as measured by a non-contact type optical surface roughness tester, is preferably 10 nm or less, and more preferably 5 nm or less. The above described arithmetic average roughness Ra in the surface A may be more than 0.1 nm. The arithmetic average roughness Ra in the present disclosure is based on that defined in JIS B0601 (2013).

The region to be measured by the non-contact type optical surface roughness tester is not particularly limited, as long as the region is that in the surface A which has an area of 4,200 μm². Accordingly, the surface A in the optical member according to the present disclosure is required to include a region having an area of 4,200 μm² in which the arithmetic average roughness Ra is 10 nm or less, and the arithmetic average roughness Ra of the region other than that region in the surface A may be 10 nm or less, or more than 10 nm.

Figure 3:
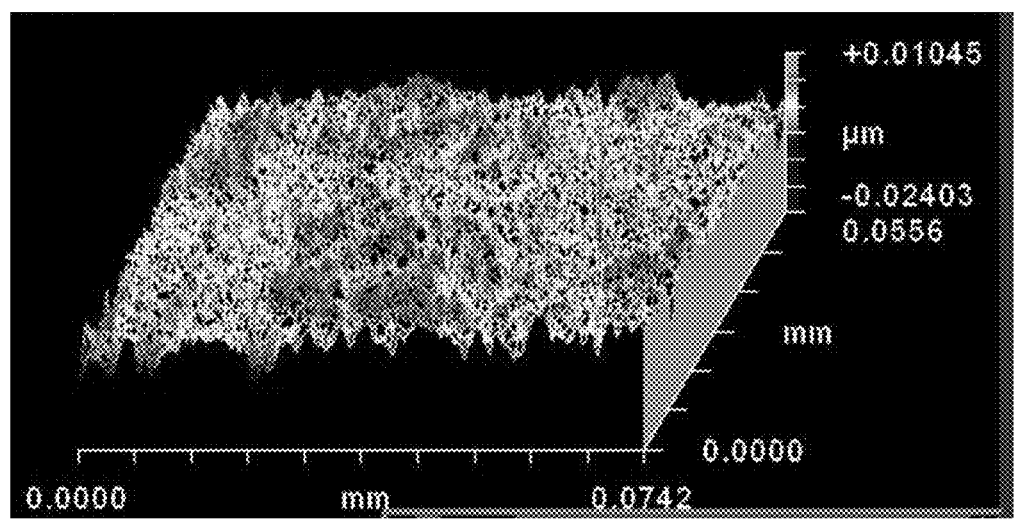
FIG. 3 shows three-dimensional data imaged by a non-contact type optical surface roughness tester.
Figure 4:
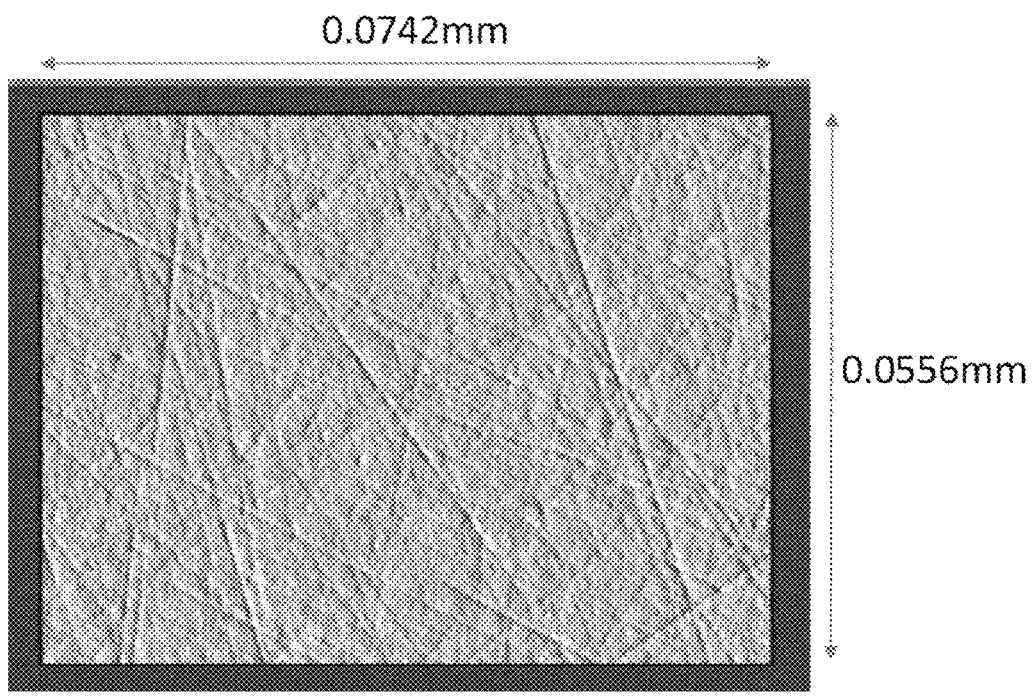
FIG. 4 shows image data of polishing marks.

In the optical member according to the present disclosure, it is preferred that a plurality of linear marks having a height of 50 nm or less are observed, in an image of a region having an area of 4,200 μm² in the surface A, when the region is imaged by a non-contact type optical surface roughness tester. By this configuration, in a case in which a plurality of the optical members according to the present disclosure are layered such that the regions in which the linear marks are observed are in contact with each other, for example, the resulting laminated structure can be more easily maintained. The plurality of the linear marks described above may be polishing marks, and may be polishing marks formed by polishing a molded member by a production method to be described later. Each as one example, FIG. 3 shows the three-dimensional data of the optical member according to the present disclosure, imaged by the non-contact type optical surface roughness tester, and FIG. 4 shows the image data of polishing marks in the optical member according to the present disclosure. The polishing marks as shown in FIG. 4 are easily formed by polishing the molded member in accordance with the production method to be described later. The polishing marks to be formed on the optical member according to the present disclosure are not limited to the shape, size and the like of those shown in FIG. 4.

The expression "height of linear marks" as used herein refers to the difference between the highest position and the lowest position of the linear marks imaged by the non-contact type optical surface roughness tester.

From the viewpoint of maintaining the laminated structure of the optical members, it is preferred that five or more of the linear marks described above are observed, in an image of a region having an area of 4,200 μm² in the surface A, when the region is imaged by the non-contact type optical surface roughness tester.

At least some of the plurality of the linear marks may be parallel to one another, or may be crossed with one another. In particular, when at least some of the plurality of the linear marks are crossed with one another, and in a case in which another layer (such as an adhesive layer or a tacky layer) is layered on the surface A, or another member is layered on the surface A, for example, the occurrence of relative positional displacement between the surface A and the other layer, or between the surface A and the other member, for example, can be more easily reduced.

The region to be measured and observed by the non-contact type optical surface roughness tester may be a region having an area of 4,200 μm² whose center is the center of gravity of the surface A. In a case in which another layer (such as an adhesive layer or a tacky layer) is layered on the surface A, the presence of the linear marks enhances the adhesion between the surface A and the other layer, making the relative positional displacement between the surface A and the other layer less likely to occur. Further, in a case in which another member is provided so as to be in contact with the surface A, the relative positional displacement between the surface A and the other member is less likely to occur.

The optical member according to the present disclosure preferably has a Vickers hardness at 23° C. of 1 GPa or less. In other words, it is preferred that the optical member is relatively soft. The Vickers hardness at 23° C. of the optical member may be measured in accordance with JIS Z 2244 (2009).

The optical member according to the present disclosure preferably has a tensile elastic modulus at 23° C. of from $1.0 \times 10^3$ MPa to $5.0 \times 10^3$ MPa. The tensile elastic modulus at 23° C. of the optical member may be measured in accordance with JIS K 7161-1 (2014).

For example, a method of producing the optical member according to the present disclosure to be described later enables to obtain an optical member which satisfies at least one of the Vickers hardness at 23° C. and the tensile elastic modulus at 23° C. described above, and which has an excellent flatness of the surface A.

The optical member may have a total light transmittance of 10% or more. The total light transmittance of the optical member may be measured in accordance with JIS K 7361-1 (1997).

The optical member preferably has a haze (total haze) of 10% or less, more preferably 1% or less, and still more preferably 0.5% or less. The haze of the optical member as used herein refers to a value measured at 25° C. in accordance with JIS-K 7105, using a haze meter [TC-HIII DPK; manufactured by Tokyo Denshoku Co., Ltd.].

The shape of the optical member is not particularly limited, and may be in the form of a plate, a cylinder, a rectangular parallelopiped, or the like. In the case of adjusting the shape of the optical member by processing, it is preferred to perform the processing of the optical member before forming the surface A of the optical member, because the parallelism, flatness and the like of the surface A are more likely to be impaired when the processing of the optical member is performed after the formation of the surface A. In general, when the optical member has a shape with corners, such as a shape in the form of a plate or a rectangular parallelopiped, the force for forming the surface A is concentrated to the corners, during the formation of the surface A, making the parallelism or the flatness in the vicinity of the corners to be more likely to be impaired. In contrast, the method of producing the optical member according to the present disclosure to be described later enables to form the surface A without applying an excessive force to the corners, during the formation of the surface A, making it possible to reduce the values of the parallelism, flatness and the like of the optical member.

The optical member preferably has a refractive index of 1.58 or more. The optical member may have a refractive index of 1.80 or less, or 1.75 or less. The refractive index of the optical member may be measured in accordance with JIS K 7142 (2014).

The optical member preferably includes, as the organic polymer to be included therein, at least one selected from the group consisting of a poly(thio)urethane resin, an episulfide resin, a polycarbonate resin, a polyester resin, a polyamide resin, a polyimide resin, a poly(meth)acrylate resin, a polyolefin resin, a polyurea-urethane resin, a polysulfide resin, a poly(meth)(thio)acrylate resin and an allyl diglycidyl carbonate resin. Among these resins, a poly(thio)urethane resin, an episulfide resin and a polycarbonate resin are preferred, and a poly(thio)urethane resin and an episulfide resin are more preferred, as the organic polymer, from the viewpoint of improving the refractive index.

The poly(thio)urethane resin is preferably a thiourethane resin. More specifically, a thiourethane resin obtained by polymerizing a diisocyanate compound and a thiol compound is preferred.

Examples of the diisocyanate compound include 2,4-tolylene diisocyanate, 2,6-tolylene diisocyanate, diphenylmethane diisocyanate, m-xylylene diisocyanate, m-phenylene diisocyanate, isophorone diisocyanate, hexamethylene diisocyanate, 2,5-bis(isocyanatomethyl)bicyclo-[2.2.1]-heptane, 2,6-bis(isocyanatomethyObicyclo-[2.2.1]-heptane, 1,3-bis(isocyanatomethyl)cyclohexane, 1,4-bis(isocyanatomethyl)cyclohexane, bis(4-isocyanatocyclohexyl)methane, and 1,5-pentamethylene diisocyanate. These diisocyanate compounds may be used singly, or in combination of two or more kinds thereof.

Examples of the thiol compound include pentaerythritol tetrakis(3-mercaptopropionate), pentaerythritol tetrakis(2-mercaptoacetate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, bis(mercaptomethylthio)ethyl)-1,3-dithietane, 1,2-bis(mercaptomethyl) benzene, 1,3-bis(mercaptomethyl)benzene, and 1,4-bis(mercaptomethyl)benzene. These thiol compounds may be used singly, or in combination of two or more kinds thereof.

The episulfide resin may be any resin in which a compound having an episulfide group is used as a main component or a sub component of a starting material of the resin. Examples of the compound having an episulfide group include episulfide compounds described in in WO 2017/159839 and Japanese Patent Application Laid-Open (JP-A) No. 2018-154690, thioepoxy compounds described in JP-A No. 2002-194083, and novel tetrathiaspiro compounds described in in JP-A No. 2019-1785.

The content of the organic polymer included in the optical member is preferably 80% by mass or more, and more preferably 90% by mass or more, with respect to the total amount of the optical member, from the viewpoint achieving a reduction in weight. Further, the content of the organic polymer included in the optical member may be 100% by mass, or may be 99% by mass or less, with respect to the total amount of the optical member.

The optical member may include another component other than the organic polymer. Examples of the other component include ultraviolet absorbers, antioxidants, photostabilizers, deterioration inhibitors, pigments (such as photochromic materials), release agents, dyes, pigments, and polymerization catalysts.

The application of the optical member according to the present disclosure is not particularly limited, and can be used, for example, in a display device, an imaging apparatus, an optical device or the like. More specifically, the optical member can be used in a wearable device, still more specifically, in a wearable display in which virtual reality (VR), augmented reality (AR) or the like is realized.

<Method of Producing Optical Member>

A method of producing the optical member according to the present disclosure includes:

a step of preparing a molded member including an organic polymer; and a first polishing step of polishing the molded member with a polishing pad, after arranging the molded member in a movement restriction member which restricts the movement of the molded member during the polishing of the molded member;

wherein, in the first polishing step, the molded member is polished using an abrasive material having a grain size of 3 μm or more.

By this method, the optical member according to the present disclosure described above can be obtained.

The production method according to the present disclosure includes a step of preparing a molded member including an organic polymer. The molded member is an optical member before being subjected to a polishing treatment, and the shape of the molded member may be selected as appropriate, depending on the shape of the optical member to be produced. For example, the molded member may be produced by pouring a composition containing monomers as raw materials of the organic polymer into a mold, and then irradiating UV light or the like to the composition so as to polymerize the monomers.

(First Polishing Step)

The production method according to the present disclosure includes the first polishing step of polishing the molded member with a polishing pad, after arranging the molded member in a movement restriction member which restricts the movement of the molded member during the polishing of the molded member. In the first polishing step, at least one surface of the molded member which will constitute the surface A in the resulting optical member is polished, and preferably, each of both surfaces of the molded member which will constitute the surface A and the surface B in the resulting optical member is polished. In the case of polishing one surface of the molded member, the polishing may be performed using a single-sided polishing machine in which a polishing pad is provided on one of the upper and lower lapping plates. In the case of polishing both surfaces of the molded member, the polishing may be performed using a double-sided polishing machine in which a polishing pad is provided on each of both the upper and lower lapping plates.

The movement restriction member is required to have a configuration which allows the molded member to be arranged therein, and enables to restrict the movement of the molded member during the polishing of the molded member with a polishing pad. Further, the movement restriction member may have a configuration which retains the molded member such that the molded member is not movable relative to the movement restriction member, during the polishing of the molded member with a polishing pad. Alternatively, the movement restriction member may have a configuration which allows the molded member to be arranged therein such that the molded member is movable relative to the movement restriction member. In the latter configuration, an optical member in which the flatness of the surface A is high, and which is excellent in the parallelism between the surface A and the surface B tends to be more easily obtained.

In the first polishing step, the molded member may be polished while supplying a known polishing liquid, grinding liquid or the like.

In the first polishing step, the molded member is preferably polished using an abrasive material having a grain size of from 5 µm to 10 µm, and more preferably using an abrasive material having a grain size of from 7 µm to 10 µm, from the viewpoint of improving the polishability of the molded member. The polishing of the molded member using the abrasive material having a grain size of 3 µm or more described above, can be performed, for example, by: a method of polishing the molded member using a polishing pad (having a pad roughness of 3 µm or more) in which an abrasive material (fixed abrasive grains), such as diamond having a grain size of 3 µm or more, is embedded; or a method of polishing the molded member using an abrasive material (loose abrasive grains), such as diamond having a grain size of 3 µm or more, and a polishing pad. In general, an abrasive material having a smaller grain size is more preferred, in order to smoothen the surface(s) of a molded member including an inorganic material. In the case of polishing a molded member including an organic polymer, which is softer than an inorganic material, in contrast, the present inventors have found out that the values of the parallelism, flatness and the like can be reduced by using an abrasive material having a grain size equal to or higher than a certain value, different from the usual case.

In the first polishing step, the molded member is preferably arranged in the movement restriction member such that the clearance between the molded member and the movement restriction member is 1 mm or more. By this configuration, an optical member which has a higher flatness of the surface A, and which has a better parallelism between the surface A and the surface B tends to be more easily obtained.

In the first polishing step, the clearance described above is preferably 3 mm or more, more preferably 5 mm or more, and still more preferably 10 mm or more. Further, the clearance may be 30 mm or less.

In the present disclosure, the term "clearance" refers to a value represented by (A−B)/2, wherein A and B are defined as follows. In a case in which the movement restriction member has side surfaces in the form of a polygon, the maximum value of the distance between the side surfaces is defined as length A; in a case in which the movement restriction member has a side surface in the form of a circle, the diameter of the member is defined as the length A; in a case in which the molded member has side surfaces in the form of a polygon, the maximum value of the distance between the side surfaces is defined as length B; and in a case in which the molded member has a side surface in the form of a circle, the diameter of the member is defined as the length B. Providing a clearance enables to prevent an excessive force from being applied to the peripheral portion of the molded member including an organic polymer, during the polishing of the molded member including an organic polymer, making it possible to reduce the values of the parallelism, flatness and the like. Although providing a clearance makes the movement restriction member and the peripheral portion of the molded member more prone to collide with each other during the formation of the surface A, it is assumed that the molded member is less susceptible to deformation even when the movement restriction member and the peripheral portion of the molded member collide with each other during the formation of the surface A, because of the flexibility of the molded member including an organic polymer. In contrast, in a case in which an inorganic-based molded member, which includes a hard inorganic material such as glass as a main component, is polished with a clearance provided, it is thought that the force applied from the movement restriction member to the inorganic-based molded member is more easily transmitted to the entire portion of the inorganic-based molded member, making it possible to reduce the values of the parallelism, flatness and the like. However, it is expected that the movement restriction member and the peripheral portion of the inorganic-based molded member collide with each other, making the inorganic-based molded member more susceptible to damage.

In the first polishing step, the molded member may be polished by planetary polishing. The term "planetary polishing" refers to polishing the molded members while allowing the movement restriction members in which the molded members are arranged to revolve and rotate.

In the case of performing the planetary polishing of the molded members, it is preferred to use a double-sided polishing machine employing a planetary gear system. FIG. 1 shows a perspective view illustrating the meshing relationship between a sun gear, an internal gear and movement restriction members, in a planetary gear system. The planetary gear system shown in FIG. 1 includes: a sun gear 30; an internal gear 40 arranged concentrically outside the sun gear 30; and movement restriction members 50 which mesh with the sun gear 30 and the internal gear 40, and which revolve and rotate corresponding to the rotation of the sun gear 30 and the internal gear 40. In each of these movement restriction members 50, a plurality of molded members W are arranged. Further, both surfaces of the molded members W arranged in the movement restriction members 50 are polished by polishing pads which are provided on the upper and lower lapping plates of the double-sided polishing machine employing the planetary gear system.

In the case of using the double-sided polishing machine, the speed of rotation of the upper polishing pad is preferably from 5 rpm to 30 rpm, and more preferably from 7 rpm to 20 rpm. The speed of rotation of the lower polishing pad is preferably from 20 rpm to 50 rpm, and more preferably from 25 rpm to 40 rpm. The direction of rotation of the upper polishing pad may be the same as, or the opposite of that of the lower polishing pad.

The speed of revolution of the movement restriction members in which the molded members are arranged is preferably from 5 rpm to 30 rpm, and more preferably from 7 rpm to 20 rpm. The direction of revolution of the movement restriction members may be the same as, or the opposite of that of the lower polishing pad.

Further, the speed of rotation of the movement restriction members in which the molded members are arranged is preferably from 2 rpm to 50 rpm, and more preferably from 5 rpm to 20 rpm.

(Second Polishing Step)

It is preferred that the method of producing the optical member according to the present disclosure further includes a second polishing step of polishing the molded member after being subjected to the first polishing step, with a polishing pad and an abrasive material. In the second polishing step, it is possible to use a polishing pad different from one used in the first polishing step, such as, for example, a suede type polishing pad in which a nap layer made of a resin such as a urethane resin or an ester resin is provided on a substrate.

In the second polishing step, the molded member may be polished while supplying a known polishing liquid, grinding liquid or the like which contains an abrasive material such as alumina.

<Apparatus for Transmitting Optical Information>

An apparatus for transmitting optical information according to the present disclosure include:
- a light irradiation section; and
- a light guide including a plurality of the optical members according to the present disclosure described above, wherein the plurality of the optical members are arranged such that principal surfaces of the optical members are substantially parallel to one another.

This apparatus for transmitting optical information is lightweight, and is capable of transmitting optical information with a high accuracy, due to including a plurality of the optical members described above.

In the apparatus for transmitting optical information according to the present disclosure, the above described optical members according to the present disclosure may be directly disposed one on another in layers, or may be disposed one on another in layers with an adhesive layer(s) interposed between the optical members. The adhesive layer may be formed, for example, by applying a composition containing monomers as raw materials of an organic polymer to one optical member, to form a composition layer, sandwiching the thus formed composition layer between two pieces of the optical members, and then irradiating light, such as UV light, to the composition layer so as to polymerize the monomers.

Figure 2:
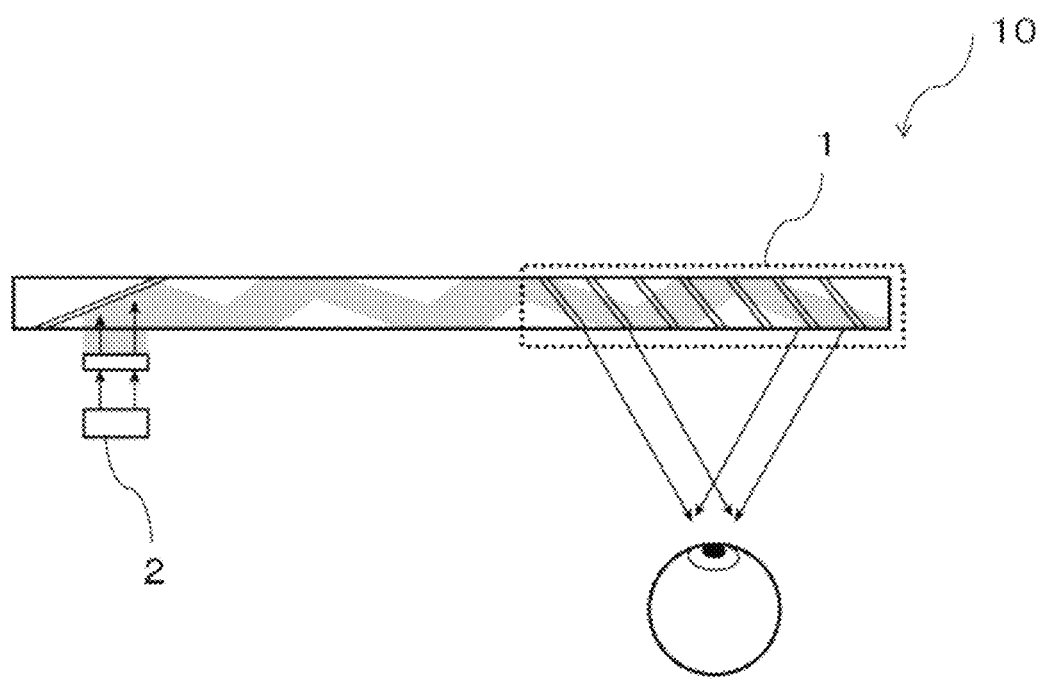
FIG. 2 is a schematic configuration diagram showing one example of an apparatus for transmitting optical information according to the present disclosure.

FIG. 2 shows one example of the apparatus for transmitting optical information according to the present disclosure. An apparatus for transmitting optical information 10 includes: an image display section 1; and a light guide in which a plurality of optical members 2 are arranged. The light generated from the image display section 1 is reflected by the optical members 2 in the light guide, and the light reflected and scattered by the plurality of the optical members 2 is irradiated into the eyes of a user wearing the apparatus for transmitting optical information 10, as a result of which an image displayed on the image display section 1 is recognized by the user.

EXAMPLES

The present invention will now be specifically described in further detail, based on Examples. However, it is noted that the invention is in no way limited to these Examples.

Experimental Examples 1 to 4

First, molded members each composed of the following material, and is in the form of a disk having a diameter of 80 mm and a height of 1.7 mm, were prepared. The molded members had a Vickers hardness of 228 MPa, and a tensile elastic modulus at 23° C. of $3.8 \times 10^3$ MPa.

(Material)

MR10 (a thiourethane resin; refractive index: 1.67; manufactured by Mitsui Chemicals, Inc.)

<Production of Optical Members>

The thus prepared molded members were arranged in fixing devices (corresponding to movement restriction members) with openings on both surfaces, of a polishing apparatus (9B double-sided lapping machine), such that the two circular surfaces of each molded member would be the surfaces to be polished. The clearance between wall surfaces of the fixing devices and the molded members was set to 20 mm. Thereafter, the first polishing step was carried out, using the polishing pads and the grinding liquid shown below, and under the following polishing conditions.

(Polishing Pads (Upper Pad and Lower Pad))

Diamond pads (pad roughness: 9 µm, corresponding to #2000)

(Grinding Liquid)

Grinding liquid (pH: 9.3)

(Polishing Conditions in First Polishing Step)

The molded members were polished (by planetary polishing) by: introducing the grinding liquid under the following conditions; rotating the upper pad and the lower pad under the following conditions; and allowing the fixing devices in which the molded members were arranged to rotate and revolve under the following conditions.

The amount of the grinding liquid introduced: 3.8 L/min

Pad pressure: surface pressure 80 g

Speed of rotation of upper pad: 10 rpm (rotated in the direction opposite from that of the lower pad)

Speed of rotation of lower pad: 30 rpm

Speed of rotation of fixing devices: 5 rpm

Speed of revolution of fixing devices: 10 rpm (rotated in the same direction as that of the lower pad)

Polishing amount: 840 µm

After performing the first polishing step described above, the second polishing step was carried out, using the polishing pads and the grinding liquid shown below, and under the following polishing conditions. The clearance between the wall surfaces of the fixing devices and the molded members was to 20 mm.

(Polishing Pads (Upper Pad and Lower Pad))

Suede pads (thickness: 0.95 mm, compression rate: 3.5%)

Nap layers (NAP length: 570 µm, compressive elastic modulus: 60%, opening diameter: 25 µm)

(Grinding Liquid)

POLIPLA 608S (high-purity alumina; average particle size: 1.3 µm, pH: 3.4; manufactured by Fujimi Incorporated)

(Polishing Conditions in Second Polishing Step)

The molded members were polished (by planetary polishing) by: introducing the grinding liquid under the following conditions; rotating the upper pad and the lower pad under the following conditions; and allowing the fixing devices in which the molded members were arranged to rotate and revolve under the following conditions.

The amount of the grinding liquid introduced: 14 L/min
Pad pressure: surface pressure 120 g
Speed of rotation of upper pad: 10 rpm
Speed of rotation of lower pad: 30 rpm
Speed of rotation of fixing devices: 5 rpm
Speed of revolution of fixing devices: 10 rpm
Polishing amount: 49 µm The first polishing step and the second polishing step described above were performed to obtain optical members each in the form of a disk having a diameter of 80 mm and a height of 0.81 mm.

Experimental Examples 5 to 7

First, molded members each composed of the following material, and is in the form of a disk having a diameter of 80 mm and a height of 2.0 mm, were prepared. The molded members had a Vickers hardness of 205 MPa, and a tensile elastic modulus at 23° C. of $3.1 \times 10^3$ MPa.

(Material)

MR8 (a thiourethane resin; refractive index: 1.6; manufactured by Mitsui Chemicals, Inc.)

The first polishing step was carried out in the same manner as in Experimental Examples 1 to 4, except that the clearance between the wall surfaces of the fixing devices and the molded members were changed from 20 mm to 0.5 mm, and the pad pressure was changed from a surface pressure of 80 g to 100 g. The polishing amount in the first polishing step was 1,170 µm.

Further, the second polishing step was carried out in the same manner as in Experimental Examples 1 to 4, except that the clearance between the wall surfaces of the fixing devices and the molded members were changed from 20 mm to 0.5 mm, the speed of rotation of the upper pad was changed from 10 rpm to 5 rpm, the speed of rotation of the lower pad was changed from 30 rpm to 15 rpm, the speed of rotation of the fixing devices was changed from 5 rpm to 2 rpm, and the speed of revolution of the fixing devices was changed from 10 rpm to 5 rpm. The polishing amount in the second polishing step was 22 µm.

The first polishing step and the second polishing step described above were performed to obtain optical members each in the form of a disk having a diameter of 80 mm and a height of 0.808 mm.

Experimental Example 8

The first polishing step was carried out in the same manner as in Experimental Examples 1 to 4, except that the diamond pads (pad roughness: 9 µm, corresponding to #2000) used in Experimental Examples 1 to 4 were changed to diamond pads (pad roughness: 2 µm, corresponding to #6000). However, the polishing of the molded members did not proceed in Experimental Example 8.

Experimental Example 9

The first polishing step was carried out in the same manner as in Experimental Examples 5 to 7, except that the diamond pads (pad roughness: 9 µm, corresponding to #2000) used in Experimental Examples 5 to 7 were changed to diamond pads (pad roughness: 2 µm, corresponding to #6000). However, the polishing of the molded members did not proceed in Experimental Example 9.

(Measurement of Flatness and Calculation of Absolute Value of Difference in Flatness)

For each of the two circular surfaces of each of the optical members of Experimental Examples 1 to 7, the flatness of the region having an area of 1 mm² whose center is the center of gravity was measured, using a flatness measurement device (FlatMaster-Industrial, manufactured by Corning Tropel). Further, the absolute value of the difference in flatness between the two circular surfaces measured, was calculated.

The results are shown in Table 1.

(Measurement of Arithmetic Average Roughness)

For each of the two circular surfaces of each of the optical members of Experimental Examples 1 to 7, the arithmetic average roughness Ra of the region of 70 µm×60 µm whose center is the center of gravity was measured, using an optical device for measuring surface characteristics (NEW VIEW 7300, manufactured by Zygo Corporation), which is a non-contact type optical surface roughness tester.

The results are shown in Table 2.

(Confirmation of Polishing Marks)

For each of the two circular surfaces of each of the optical members of Experimental Examples 1 to 7, an image of the region of 70 µm×60 µm whose center is the center of gravity was imaged, using the optical device for measuring surface characteristics (NEW VIEW 7300, manufactured by Zygo Corporation). As a result, a plurality of linear marks having a height of 50 nm or less were observed in the images of the two circular surfaces. These linear marks are assumed to be polishing marks.

TABLE 1

| | Measured Results of Flatness (µm) | | Absolute Value of Difference in Flatness (µm) |
| --- | --- | --- | --- |
| | Top Surface (upper pad side) | Bottom Surface (lower pad side) | \|Top Surface − Bottom Surface\| |
| Experimental Example 1 | 15.304 | 13.376 | 1.928 |
| Experimental Example 2 | 16.885 | 13.190 | 3.695 |
| Experimental Example 3 | 17.228 | 15.594 | 1.634 |
| Experimental Example 4 | 20.347 | 17.365 | 2.982 |
| Experimental Example 5 | 17.436 | 8.698 | 8.738 |

TABLE 1-continued

| | Measured Results of Flatness (μm) | | Absolute Value of Difference in Flatness (μm) \|Top Surface − Bottom Surface\| |
|---|---|---|---|
| | Top Surface (upper pad side) | Bottom Surface (lower pad side) | |
| Experimental Example 6 | 19.157 | 11.322 | 7.835 |
| Experimental Example 7 | 76.792 | 78.387 | 1.595 |

TABLE 2

| | Measured Results of Arithmetic Average Roughness Ra (nm) | |
|---|---|---|
| | Center of Gravity | End Side (a part) of the Measured Region |
| Experimental Example 1 | 3.420 | 4.120 |
| Experimental Example 2 | 3.517 | 3.973 |
| Experimental Example 3 | 3.366 | 2.979 |
| Experimental Example 4 | 3.257 | 3.155 |
| Experimental Example 5 | 3.084 | 2.712 |
| Experimental Example 6 | 2.947 | 3.248 |
| Experimental Example 7 | 2.980 | 3.606 |

As shown in Table 1, in Experimental Examples 1 to 4, optical members in each of which the measured values of the flatness of the top surface and the bottom surface are low, and the absolute value of the difference in flatness is also low, were obtained.

In Experimental Examples 5 and 6, optical members in each of which the measured values of the flatness of the top surface and the bottom surface are low were obtained, and in Experimental Example 7, an optical member in which the absolute value of the difference in flatness is low was obtained.

The disclosure of Japanese Patent Application No. 2019-026906, filed on Feb. 18, 2019 is incorporated herein by reference in their entirety.

All publications, patent applications, and technical standards mentioned in the present specification are incorporated herein by reference to the same extent as if such individual publication, patent application, or technical standard was specifically and individually indicated to be incorporated by reference.

The invention claimed is:

1. A method of producing an optical member comprising an organic polymer, the method comprising:
a step of preparing a molded member including the organic polymer,
a first polishing step of polishing the molded member with a polishing pad, after arranging the molded member in a movement restriction member which restricts the movement of the molded member during the polishing of the molded member, and
a second polishing step of polishing the molded member after being subjected to the first polishing step, with a suede type polishing pad in which a nap layer is provided and a polishing liquid containing an abrasive material made of alumina,
wherein, in the first polishing step, the molded member is polished using an abrasive material having a grain size of 3 μm or more and the optical member is produced from the molded member by the first polishing step and the second polishing step,
wherein the optical member comprises a surface A which has an area of 1 mm² or more, and in which a flatness of a region having an area of 1 mm², as measured by a non-contact type optical flatness meter, is 80 μm or less, a plurality of linear marks having a height of 50 nm or less are observed, in an image of a region having an area of 4,200 μm² in the surface A, when the region is imaged by a non-contact type optical surface roughness tester, and the plurality of the linear marks are polishing marks.

2. The method of producing the optical member according to claim 1, wherein the flatness of the surface A is 50 μm or less.

3. The method of producing the optical member according to claim 1, comprising a surface B located on an opposite side of the surface A, and having an area of 1 mm² or more,
wherein, when a flatness of a region having an area of 1 mm² is measured for each of the surface A and the surface B by the non-contact type optical flatness meter, an absolute value of a difference between the flatness of the surface A and the flatness of the surface B is 5 μm or less.

4. The method of producing the optical member according to claim 3, wherein an average distance between the surface A and the surface B is 10 mm or less.

5. The method of producing the optical member according to claim 1, wherein an arithmetic average roughness Ra of a region having an area of 4,200 μm² in the surface A, as measured by a non-contact type optical surface roughness tester, is 10 nm or less.

6. The method of producing the optical member according to claim 1, wherein the optical member has a refractive index of 1.58 or more.

7. The method of producing the optical member according to claim 1, wherein the optical member has a Vickers hardness at 23° C. of 1 GPa or less.

8. The method of producing the optical member according to claim 1, wherein the optical member has a tensile elastic modulus at 23° C. of from $1.0 \times 10^3$ MPa to $5.0 \times 10^3$ MPa.

9. The method of producing the optical member according to claim 1, wherein the organic polymer comprises at least one selected from the group consisting of a poly(thio)urethane resin, an episulfide resin, a polycarbonate resin, a polyester resin, a polyamide resin, a polyimide resin, a poly(meth)acrylate resin, a polyolefin resin, a polyureaurethane resin, a polysulfide resin, a poly(meth)(thio)acrylate resin and an allyl diglycidyl carbonate resin.

10. The method of producing the optical member according to claim 1, wherein the optical member is for use in a wearable device.

11. The method of producing the optical member according to claim 1, wherein the molded member is movable relative to the movement restriction member, during the polishing of the molded member with the polishing pad.

12. The method of producing the optical member according to claim 1, wherein, in the first polishing step, the molded member is arranged in the movement restriction member such that a clearance between the molded member and the movement restriction member is 1 mm or more.

13. An method of producing an apparatus for transmitting optical information, the method comprising:
- a step of producing an optical member by the method of producing the optical member according to claim 1, and
- a step of directly disposing the optical member one on another in layers, or disposing the optical member one on another in layers with an adhesive layer interposed between the optical members, and the apparatus comprising:
- a light irradiation section; and
- a light guide comprising a plurality of the optical members, wherein the plurality of the optical members are arranged such that principal surfaces of the optical members are substantially parallel to one another.

14. A method of producing an optical member comprising an organic polymer, the method comprising:
- a step of preparing a molded member including the organic polymer,
- a first polishing step of polishing the molded member with a polishing pad, after arranging the molded member in a movement restriction member which restricts the movement of the molded member during the polishing of the molded member, and
- a second polishing step of polishing the molded member after being subjected to the first polishing step, with a suede type polishing pad in which a nap layer is provided and a polishing liquid containing an abrasive material made of alumina, wherein, in the first polishing step, the molded member is polished using an abrasive material having a grain size of 3 μm or more and the optical member is produced from the molded member by the first polishing step and the second polishing step, wherein the optical member comprises:
- a surface A having an area of 1 $mm^2$ or more; and
- a surface B located on an opposite side of the surface A, and having an area of 1 $mm^2$ or more;

wherein, when a flatness of a region having an area of 1 $mm^2$ is measured for each of the surface A and the surface B by a non-contact type optical flatness meter, an absolute value of a difference between the flatness of the surface A and the flatness of the surface B is 5 μm or less, a plurality of linear marks having a height of 50 nm or less are observed, in an image of a region having an area of 4,200 $\mu m^2$ in the surface A, when the region is imaged by a non-contact type optical surface roughness tester, the plurality of the linear marks are polishing marks, the flatness of the surface A is 80 μm or less and the flatness of the surface B is 80 μm or less.

* * * * *